United States Patent
Mishra

(10) Patent No.: US 9,207,843 B2
(45) Date of Patent: Dec. 8, 2015

(54) METHOD AND APPARATUS FOR PRESENTING CONTENT VIA SOCIAL NETWORKING MESSAGES

(71) Applicant: Nokia Corporation, Espoo (FI)

(72) Inventor: Pranav Mishra, Bangalore (IN)

(73) Assignee: Nokia Technologies Oy, Espoo (FI)

(*) Notice: Subject to any disclaimer, the term of this patent is extended or adjusted under 35 U.S.C. 154(b) by 195 days.

(21) Appl. No.: 13/850,800

(22) Filed: Mar. 26, 2013

(65) Prior Publication Data

US 2013/0254716 A1    Sep. 26, 2013

(30) Foreign Application Priority Data

Mar. 26, 2012  (IN) ............................ 1125/CHE/2012

(51) Int. Cl.
- *G06F 13/00*    (2006.01)
- *G06F 15/00*    (2006.01)
- *G06F 3/0484*   (2013.01)
- *G06F 3/01*     (2006.01)
- *G06Q 50/00*    (2012.01)
- *G06Q 30/02*    (2012.01)

(52) U.S. Cl.
CPC ............ *G06F 3/04842* (2013.01); *G06F 3/013* (2013.01); *G06Q 30/02* (2013.01); *G06Q 50/01* (2013.01)

(58) Field of Classification Search
CPC .............................. G06F 3/04842; G06F 3/013
USPC .......... 715/851–853, 762–765, 751–753, 740
IPC .......................................... G06Q 10/10, 10/109
See application file for complete search history.

(56) References Cited

U.S. PATENT DOCUMENTS

2011/0258556 A1* 10/2011 Kiciman et al. ............... 715/751
2014/0173459 A1*  6/2014 Gaiser et al. .................. 715/753

* cited by examiner

*Primary Examiner* — Kevin Nguyen
(74) *Attorney, Agent, or Firm* — Ditthavong & Steiner, P.C.

(57) ABSTRACT

An example approach is provided for presenting content in a user interface associated with social networking messages based on gaze tracking information. A content presentation platform determines a rendering of a user interface presenting one or more social networking messages. The content presentation platform further determines a selection of at least one of the one or more social networking messages based, at least in part, on gaze tracking information. The content presentation platform also causes, at least in part, a presentation of content at the user interface based, at least in part, on the selection.

22 Claims, 11 Drawing Sheets

METHOD AND APPARATUS FOR PRESENTING CONTENT VIA SOCIAL NETWORKING MESSAGES

CROSS-REFERENCE TO RELATED APPLICATION

This application claims benefit of the earlier filing date under 35 U.S.C. §119(a) of Indian Application No. 1125/CHE/2012 filed on Mar. 26, 2012, entitled "Method and Apparatus for Presenting Content via Social Networking Messages," the entirety of which is incorporated herein by reference.

BACKGROUND

Service providers and device manufacturers (e.g., wireless, cellular, etc.) are continually challenged to deliver value and convenience to consumers by, for example, providing compelling network services. Social networking services are one type of compelling network service that allows users to share information regarding themselves and other entities. The users may share information using social networking messages that are distributed throughout the social networking services. Social networking services also allow users to share information on what they like and, in some instances, on what they do not like. Such information may be collected and distributed to other users on the social networking services by, for example, posting to the user's profile page and other users' profile pages that are friends with the user. However, currently there is no system in place for controlling the presentation of such information in an uncluttered way so that the user viewing the information can easily perceive the information while at the same time not being inundated by the information. Accordingly, service providers and device manufacturers face significant technical challenges in effectively presenting the information on social networking services to users of the services.

SOME EXAMPLE EMBODIMENTS

Therefore, there is a need for an approach for presenting content in a user interface associated with social networking messages based on gaze tracking information.

According to one embodiment, a method comprises determining a rendering of a user interface presenting one or more social networking messages. The method also comprises determining a selection of at least one of the one or more social networking messages based, at least in part, on gaze tracking information. The method further comprises causing, at least in part, a presentation of content at the user interface based, at least in part, on the selection.

According to another embodiment, an apparatus comprises at least one processor, and at least one memory including computer program code for one or more computer programs, the at least one memory and the computer program code configured to, with the at least one processor, cause, at least in part, the apparatus to determine a rendering of a user interface presenting one or more social networking messages. The apparatus is also caused to determine a selection of at least one of the one or more social networking messages based, at least in part, on gaze tracking information. The apparatus is further caused to present content at the user interface based, at least in part, on the selection.

According to another embodiment, a computer-readable storage medium carries one or more sequences of one or more instructions which, when executed by one or more processors, cause, at least in part, an apparatus to determine a rendering of a user interface presenting one or more social networking messages. The apparatus is also caused to determine a selection of at least one of the one or more social networking messages based, at least in part, on gaze tracking information. The apparatus is further caused to present content at the user interface based, at least in part, on the selection.

According to another embodiment, an apparatus comprises means for determining a rendering of a user interface presenting one or more social networking messages. The apparatus also comprises means for determining a selection of at least one of the one or more social networking messages based, at least in part, on gaze tracking information. The apparatus further comprises means for causing, at least in part, a presentation of content at the user interface based, at least in part, on the selection.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for presenting content in a user interface associated with social networking messages based on gaze tracking information are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
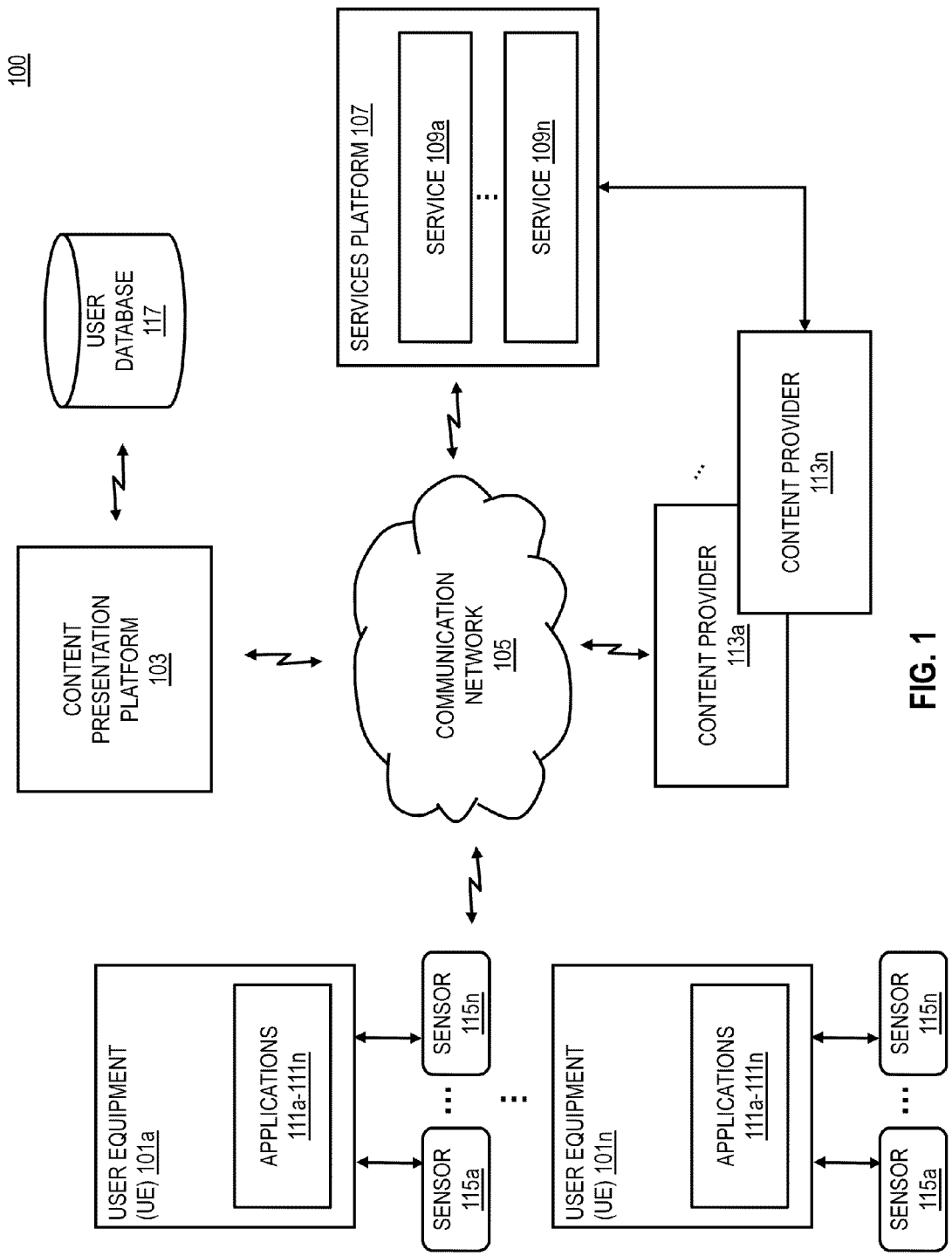
FIG. 1 is a diagram of a system capable of presenting content in a user interface associated with social networking messages based on gaze tracking information, according to one embodiment.

FIG. 1 is a diagram of a system capable of presenting content in a user interface associated with social networking messages based on gaze tracking information, according to one embodiment. Social networking services provide an avenue for the presentation of content to users based on social networking messages. For example, a user may notify associated users (e.g., friends) regarding the status of the user, one or more activities the user is participating in, or other types of information via social networking messages. Additional content may be associated with the social networking messages, the user associated with the social networking message, or one or more other social networking messages that may be presented within the same user interface associated with the social networking service. However, there currently exists no approach for effectively presenting content along with the social networking messages in a way that leaves the user interface uncluttered and is not distracting to the user.

Further, with the increase in popularity in social networking websites and services, such social networking services provide an avenue for entities to distribute their content (e.g., goods and/or services). Such content may be, for example, advertising information. For instance, a user may visit an entity's website and may indicate via an indicator that the user likes the entity, the entity's website, and/or the entity's goods or services. The action of the user liking the entity, in whatever form, may then cause a message to appear on a social networking website indicating that the user likes the entity. Through the associations of different users on social networking services (e.g., friends, circles, etc.), other users may see that the user likes the entity. Accordingly, such an indication acts as a new form of word-of-mouth advertisement regarding the entity, the entity's website and/or the entity's goods or services. However, neither the entity nor the social networking service has control over the word-of-mouth advertising. Rather, the control is primarily with the user that decides to like the entity, and other users that may be associated with the user and that may act on the word-of-mouth advertising. The is no way to effectively present content on the user interfaces associated with social networking service providers that allows for the control of the content without cluttering the user interface or causing the user viewing the user interface to become distracted. There is also no way to tap into the ability to have entities distribute their content on the social networking websites in a way that is more effective that merely word-of-mouth distribution models that rely on users actively distributing the content and/or indications that they like the content.

To address these problems, a system 100 of FIG. 1 introduces the capability to present content in a user interface associated with social networking messages based on gaze tracking information. The system 100 allows for the determination of a rendering of a user interface that may present one or more social networking messages. Such a user interface may be associated with a social networking service or website that allows a user to post social networking messages regarding themselves, others or any other subject and/or entity. The system 100 further determines a selection of at least one of the one or more social networking messages posted on the social networking service based on gaze tracking information. The gaze tracking information may track where a user is actually looking on the user interface to determine if the user is looking at a social networking message. The system 100 further allows for a presentation of content at the user interface based on a selection of a social networking message by the user determined based on the gaze tracking information. Such a selection may be determined by, for example, the gaze tracking information indicating that the user selected a social networking message by looking at the social networking message. The content presented may be associated with the selected social networking message, one or more users associated with the social networking message, and/or one or more other social networking messages associated with the one or more users. Accordingly, based on the gaze tracking information indicating what social networking message the user looked at, the system 100 may provide content specific to a social networking message and specific to the gaze tracking information to provide an uncluttered user interface while still providing additional content.

As shown in FIG. 1, the system 100 comprises user equipment (UE) 101a-101n (collectively referred to as UE 101) having connectivity to a content presentation platform 103 via a communication network 105. The UE 101 are any type of mobile terminal, fixed terminal, or portable terminal including a mobile handset, station, unit, device, mobile communication device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, the UE 101 may include or be associated with one or more applications 111a-111n (collectively referred to as applications 111). The applications 111 may be any type of applications that may execute on the UE 101, including one or more social networking applications, one or more navigational applications, one or more calendar applications, one or more Internet browsing applications, one or more contacts applications, etc. In one embodiment, the functions of the content presentation platform 103 may be embodied or performed by one or more of the applications 111. In one embodiment, the content presentation platform 103 may interface with one or more of the applications 111 on the UE 101 to perform one or more functions described herein.

In one embodiment, the UE 101 also may include or be associated with one or more sensors 115a-115n (collectively referred to as sensors 115). The sensors 115 may be any type of sensor that may be functionally associated with the UE 101. In one embodiment, the sensors 115 may be one or more image sensors, such as one or more still image and/or video sensors that may acquire visual information and transform the visual information into data that may be processed by the UE 101. By way of example, the one or more of the sensors 115 may include a front-facing camera. In one embodiment, the sensors 115 may be one or more specialized image sensors that are associated with determining the tracking of a user's eye with respect to a user interface. By way of example, one or more of the sensors 115 may be specialized glasses that a user wears that can track the user's eye movements relative to a user interface displayed on a UE 101.

The system 100 may also include a services platform 107 that includes one or more services 109a-109n (collectively referred to as services 109). The services 109 may provide one or more services to the UE 101, the content presentation platform 103, or any other element of the system 100. The services 109 may be any type of service, such as one or more social networking service, one or more navigational service, one or more recommendation service, etc. In one embodiment, the functions of the content presentation platform 103 may be embodied or performed by one or more of the services 109.

The system 100 also may include content providers 113a-113n (collectively referred to as content providers 113). The content providers 113 may provide content to the UE 101, the content presentation platform 103, the services 109 of the services platform 107, or any other element of the system 100. The content may be any type of content, such as one or more advertisements associated with one or more entities, one or more media files associated with one or more users and/or one or more entities, etc.

In one embodiment, the system 100 may also include a user database 117. The user database 117 may store information associated with the users, such as relationships between users and entities, users and other users, etc. The user database 117 may also store information associated with the users, such as the number of users that actually view social networking messages associated with a specific user, the entities and/or content that users like and/or dislike, or any other information described herein regarding the users, the entities, the social networking messages, the content, or a combination thereof. In one embodiment, the information stored in the user database 117 may instead be associated with and/or stored in one or more of the services 109 and/or one or more content providers 113. By way of example, a service 109a may store the entities that a user likes and/or dislikes.

The content presentation platform 103 introduces the capability to present content in a user interface associated with social networking messages based on gaze tracking information. The content presentation platform 103 determines a rendering of a user interface presenting one or more social networking messages. The content presentation platform 103 further determines a selection of at least one of the one or more social networking messages posted on the social networking service based on gaze tracking information. The gaze tracking information may be acquired by one or more of the sensors 115, such as by a front-facing camera tracking the user's eyes viewing a user interface of a UE 101a that is displaying the rendering, or by one or more sensors 115 worn by a user tracking the eye movements of the user. In one embodiment, the social networking messages may be formatted to aid the detection of the gaze tracking information. By way of example, a social networking message may be presented within a border or a designated color to better distinguish the social networking message from other portions of the user interface. Based on the gaze tracking information, the content presentation platform 103 may determine where the user's eyes are looking and determine a selection of one or more social networking messages. The content presentation platform 103 further causes a presentation of content at the user interface based on a selection of the user determined based on the gaze tracking information. Such a selection may be determined by, for example, the gaze tracking information indicating that the user selected a social networking message by looking at the social networking message. The content presented may be associated with the selected social networking message, one or more users associated with the social networking message, and/or one or more other social networking messages associated with the one or more users. The presented content may be any type of content, such as visual content and/or audio content. By way of example, the content may be one or more additional social networking messages, one or more advertisements, one or more songs, one or more videos, or a combination thereof. Accordingly, based on the gaze tracking information indicating what social networking message the user looked at, the system 100 may provide content specific to a social networking message and specific to the gaze tracking information to provide an uncluttered user interface while still providing additional content.

The content presentation platform 103 may also cause a controlling of the presentation of the content based on the gaze tracking information. According to specific gaze tracking information acquired by one or more of the sensors, the content presentation platform 103 may control the presentation of the content such that the control initiates a presentation of additional content, alternative content, or a combination thereof, initiates functionality associated with the content, resizes the presentation of the content, removes the presentation of the content, or a combination thereof.

The content presentation platform 103 may initiate a presentation of additional content and/or alternative content by detecting the user looking at the initially presented content and subsequently looking away from the initially presented content with respect to a threshold time period. Such a user action may indicate that the user is not interested in the initially presented content and can therefore present additional and/or alternative content that the user may be interested in.

The content presentation platform 103 may initiate functionality associated with the content based, for example, on a threshold period of time that the user looks at the content. By way of example, if the user looks at the content for longer than a threshold period of time, the user may be interested in the content. Accordingly, some type of functionality may occur that will allow the user to obtain information regarding the content. For instance, an email, SMS message, or some other form of communication may be generated and sent to the user and/or the UE 101 associated with the user based on the user looking at the content for longer than a threshold period of time.

The content presentation platform 103 may resize the content after, for example, detecting the user looking at the content for longer than a threshold period of time. For instance, the user looking at the content for longer than a threshold period of time may indicate that the user is interested in the content. Accordingly, the content may be resized to be larger and provide more information regarding the content and/or present the information in a larger format that is more easily readable and/or perceived. In one embodiment, the threshold period of time associated with resizing the content may be shorter than the threshold period of time associated with initiating functionality, such that the content may first be resized and subsequently have functionality initiated.

The content presentation platform 103 may remove the presentation of content based on the detected gaze information. For instance, if the user looks at the content for less than a threshold period of time, or does not look at the content within a threshold period of time after the content is presented and/or rendered, the content presentation platform 103 may remove the content because the user's gazing pattern may indicate that the user is not interested in the content.

In one embodiment, the content presentation platform 103 may determine a selection of the presentation of the content. The content presentation platform 103 may determine the selection based on the gaze tracking information. By way of example, a user may look at the presentation of the content for longer than a threshold period, which may correspond to a selection of the presentation of the content. Based on the selection of the presentation of the content, the content presentation platform 103 may process the selection of the presentation of content along with the social networking message the content is associated with to determine one or more statistics associated with the presentation of the content, the content, or a combination thereof. The statistics may indicate, for example, the number of users that view the content when the content is displayed. The statistics may also indicate other profile information associated with the users.

In one embodiment, the content presentation platform 103 may cause a linking of one or more entities associated with the content with the one or more users based on one or more interest indicators associated with the one or more users regarding the one or more entities. The interest indicators may be one or more social networking indicators that are associated with an entity that a user may select to indicate an interest or disinterest in the entity.

By way of example, one entity may be a company that has a website. Users that visit the website may be offered the ability to select some type of indicator, such as a button or an icon, that indicates the user likes the company, the company's website and/or one or more products associated with the entity. Because the indicator is a social networking indicator, a selection of the indicator may link the user's social networking profile with the indication associated with the indicator. However, in one embodiment, the association between a company and/or a user may not be associated with a social networking service but may instead be associated directly with the content presentation platform 103 such that the content presentation platform 103 determines the selection of the user and stores the selection in the user database 117. The content presentation platform 103 may also rank content based on one or more interest indicators associated with the user and the content. By way of example, the user may also indicate an interest or a disinterest in content based on one or more interest indicators. In one embodiment, the interest indicators may indicate either an interest or a disinterest in the entity and/or the content. In one embodiment, the interest indicators may indicate a degree of interest or disinterest in the entity and/or the content.

In one embodiment, the list of entities that a particular user may have shown interest in may be ranked by one or more ranking factors. Where a user has shown interest in five different entities, the five entities may be ranked based on various factors. In one embodiment, the entities may be associated with one or more metrics, such as a revenue generation metric. The entities for a user may be ranked based on the metrics. For example, out of the five entities, three of the entities may not be associated with paying for advertisements associated with the content presentation platform 103 and/or one or more services 109 (e.g., the entities may not be associated with a revenue generation metric). Accordingly, these three entities may be ranked last out of the five entities. Further, the two remaining entities may be associated with paying for advertisements associated with the content presentation platform 103. One of the entities may be associated with a higher revenue generation metric than the other entity. Thus, the entity that is associated with the higher revenue generation metric may be ranked the highest of the five entities, and the other entity may be ranked second highest of the five entities. The entities may be ranked for a particular user based on any other type of ranking factor, such as based on the name of the entity, the size of the entity, whether the entity is national or international, etc.

In one embodiment, the content presentation platform 103 determines the number of views of social networking messages associated with a user that have occurred. The content presentation platform 103 tracks the views of one or more of the social networking messages and may rank the users based on the number of views associated with the social networking messages. The content presentation platform 103 may determine the number of views of the social networking messages based on compiled gaze tracking information associated with the social networking message. By way of example, user A may transmit a social networking message. The content presentation platform 103 may determine the number of users that view the social networking message based on gaze tracking information associated with the message. For instance, the social networking message may be presented to another user (e.g., user B). If user B views the messages according to the gaze tracking information, the content presentation platform 103 determines that at least one user viewed the social networking message. If user B received the message on a display associated with the user but did not view the message based on the gaze tracking information, the content presentation platform 103 will determine that the user did not view the social networking message. Based on this approach, the content presentation platform 103 may determine the number of views associated with various users across various social networking messages. The content presentation platform 103 may then rank the users based on the compiled gaze tracking information to determine the users that have the most viewers. For example, user A may have 1.4 million users viewing their social networking messages, user B may have 1.2 million users viewing their social networking messages, and so forth.

The content presentation platform 103 may also determine other information associated with the users that both generate and view social networking messages. In one embodiment, the content presentation platform 103 may determine information regarding the users that view a social networking message and whether their interests are similar or dissimilar to the interest of the user that generates the social networking message. For example, user A may have indicated through one or more interest indicators their interest in entity Z. User B may have indicated through one or more interest indicators their interest in entity Y. Entity Z and entity Y may be competing entities, such as two business that produce competing goods. The content presentation platform 103 may determine what users viewing social networking messages of user A like entity Z and what users like entity Y. Based on the above facts, if user B views social networking messages associated with user A, the content presentation platform 103 may determine that user B likes competitors to the entities that user A likes. Thus, the content presentation platform 103 may rank the users and/or their social networking messages based on the number of users that like competitor entities.

Conversely, the content presentation platform 103 may rank the users and/or their social networking messages based on the number of users that like the same entities, or that like similar entities. User C may like the same entities, or similar entities, that user A likes. Thus, user C may be a potential customer of the entities that user A likes. Further, the content presentation platform 103 may determine the how many users that view social networking messages have liked the same entity or similar entities as user A based on a threshold time period. The content presentation platform 103 may rank the users and/or the social networking messages based on the threshold time period. For example, user C may have indicated an interest in the same entity as user A, but the indication may have occurred over a threshold period of time ago. Thus, the interest may no longer be present, or may still be present but may not be fresh.

In one embodiment, the content presented to a user after viewing a social networking message may be based on the linking and/or the ranking discussed above. The presented content may be linked to the user that generated the social networking message based on the user indicating an interest in the entity associated with the content based on one or more interest indicators. By way of example, the user may have indicated an interest towards a specific entity that is associated with one or more goods and/or services. The presented content may be associated with one or more advertisements associated with the goods and/or services of the specific entity. By way of another example, the user may have indicated an interest towards a specific entity that is associated with one or more songs, such as a music group. The presented content may be associated with one or more songs by the music group. The presented content may also be linked to the user that is viewing the social networking message based on the user being a potential customer of the content and/or entity associated with the content. For example, the content may be presented based on whether the user viewing the social networking message likes a competitor of the entity associated with the content. In one embodiment, if the user viewing the social networking message has indicated interest in similar music groups, for example, as the user that created the social networking message, the presented content may be one or more songs that are similar to the songs of the similar music groups between the users. Upon presenting the content at the user interface, the content may be controlled based on the above disclosure.

In one embodiment, the content presentation platform 103 allows for the association of revenue generation metrics between entities associated with the content and the various users that generate the social networking messages. The revenue generation metrics may be based on a set metric associated with the entity and/or may be defined based on the number of viewers that are associated with a user that generates social networking messages. By way of example, an entity may pay a higher revenue generation metric to have content associated with a user that has 1.4 million users that view the social networking messages as compared to a user that only has 1000 users that view the user's social networking messages. The content presentation platform 103 may rank the entities and the corresponding content of the entities based on the metrics to determine what content to present to users viewing social networking messages on the social networking services.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, near field communication (NFC), Internet Protocol (IP) data casting, digital radio/television broadcasting, satellite, mobile ad-hoc network (MANET), and the like, or any combination thereof.

By way of example, the UE 101, the content presentation platform 103, the services platform 107 and the content providers 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
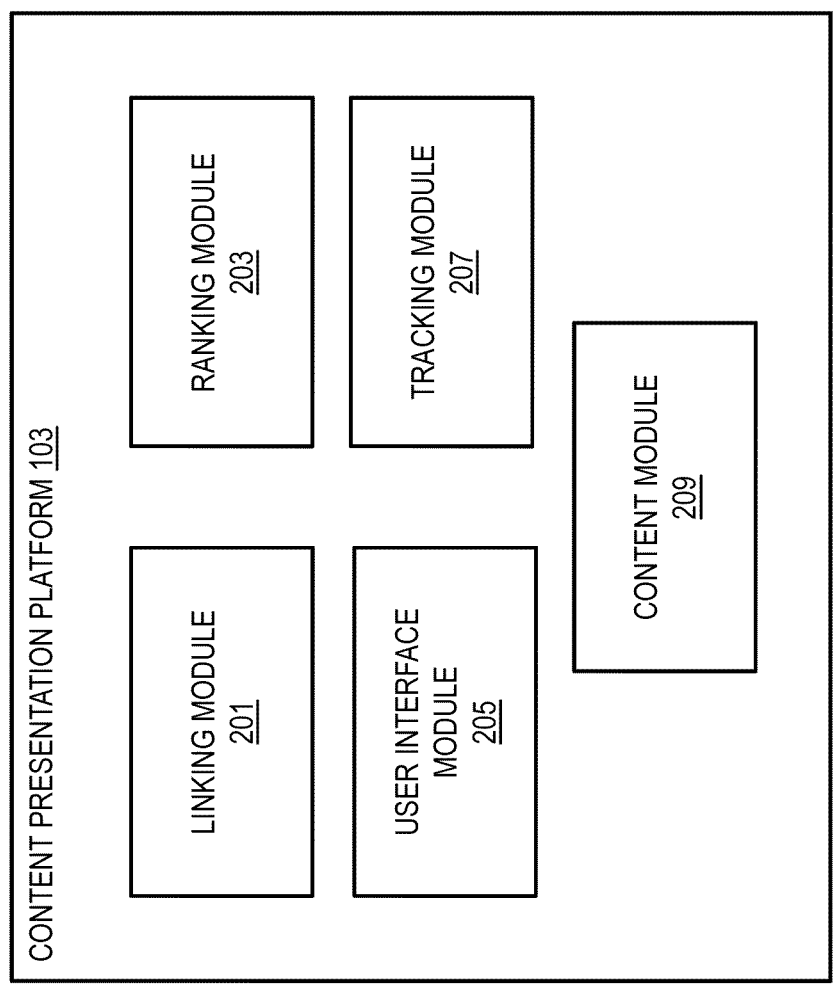
FIG. 2 is a diagram of the components of a content presentation platform, according to one embodiment.

FIG. 2 is a diagram of the components of a content presentation platform 103, according to one embodiment. By way of example, the content presentation platform 103 includes one or more components for presenting content in a user interface associated with social networking messages based on gaze tracking information. It is contemplated that the functions of these components may be combined in one or more components or performed by other components of equivalent functionality. In this embodiment, the content presentation platform 103 includes a linking module 201, a ranking module 203, a user interface module 205, a tracking module 207, and a content module 209.

In one embodiment, the linking module 201 determines associations between the users that generate the social networking messages and the entities and/or content that may be presented in response to another user viewing the social networking messages. As discussed above, a user may indicate interest in an entity and/or content associated with an entity based on one or more interest indicators. By way of example, a user may select a "like" button associated with an entity's website or a song by an entity, which indicates an interest by the user in the entities. The interest between a user and an entity and/or content of an entity creates a linking between the entity and the user. In one embodiment, the linking module 201 may determine the associations by gathering interest indication information by one or more services 109. By way of example, certain social networking services 109 allow users associated with the service to indicate their interests in various entities and/or content by selecting interest indicators associated with the social networking service. The social networking service may then include this information associated with the user. Thus, the linking module 201 may interface with the various social networking services 109 to determine the interest indication information. In one embodiment, the content presentation platform 103 may be directly associated with interest indicators such that the interest information may be determined directly by the content presentation platform 103 rather than through one or more social networking services.

In one embodiment, the linking module 201 also may determine what users are disinterested in content and/or entities based on the interest indicators. By way of example, one or more interest indicators may indicate that a user is not interested in a particular entity and/or content. Further, an indication of interest in one entity and/or content may indicate a disinterest in another entity or other that are competing entities and/or content. Accordingly, the linking module may link users with entities and/or content that the users are disinterested in.

In one embodiment, the ranking module 203 may rank the various information collected by the content presentation platform 103. In one embodiment, the ranking module 203 ranks the entities and/or the content linked to a user based on one or more ranking factors. By way of example, the ranking of entities associated with a user may be based on one or more metrics associated with the entity. In one embodiment, a metric may be a revenue generation metric such that, each time content is displayed associated with a social networking message associated with the user, the entity associated with the content pays a certain amount of money to a service 109a (e.g., such as a service provider of the content presentation platform 103). However, the metric may be any other type of metric, such as based on the size of the entity, the location of the entity, etc.

In one embodiment, the ranking module 203 ranks the various users that generate social networking messages based on the number of users that actually view the social networking messages. The number of users that actually view the social networking message may be based on compiled gaze tracking information associated with all social networking messages generated by a user that are viewed by other users. The compiled gaze tracking information may be determined as discussed below with respect to the tracking module 207. By way of example, for a particular user there may be 1.4 million users that view the social networking messages generated by the particular user. For another user, there may be 1.2 million users that view the social networking messages generated by the other user. Based on the ranking of the users, the linking of the entities and/or content with the users may be affected. For example, one or more metrics may be associated with the linking between an entity and a user. One of the metrics may be a revenue generation metric. Where a user is followed by many other users, the revenue generation metric associated with displaying content associated with social networking messages of the user may be larger than where a user is followed by only a few users.

Further, the ranking module 203 determines the associations between the users that view social networking messages of a particular user, and the entities and/or content that the users may share in common with the particular user. Users that generate social networking messages may be ranked based on the number and/or percentage of users that have similar entities and/or content in common, or based on the number and/or percentage of users that have dissimilar entities and/or content in common. For example, user A may have 2 million followers that view the user's social networking messages and user B may have 1 million. However, of the users that view user A's and user B's social networking messages, 45% of the users of user A may have interests that are different than the interests of user A, while 100% of the users of user B may have interests that are different than the interests of user B. Thus, although user A has more followers, user B has more users that may potentially change their interests based on content that is presented to them according to social networking messages that are linked with user B. Similarly, the ranking module 203 may rank the users based on the interests of the users' followers according to the number and/or percentage of users that share the same interests in the entities and/or content. A ranking of the users based on their similar interests of their followers may also be based on the time that the followers indicated their interests. Users with followers that indicated the same interests a long time ago may be ranked higher than users with followers that indicated the same interests a short time ago because, for example, the users with more current interest are likely already customers whereas the users with less current interest may not be customers.

The user interface module 205 generates and/or interfaces with one or more services or devices that present the rendering of the social networking messages and the content. The user interface may include visual interfaces, tactile interfaces, audio interfaces, or a combination thereof. In one embodiment, the user interface module 205 may generate the user interfaces for presenting the social networking messages and the content. The user interface module 205 may generate the user interfaces associated with presenting one or more visual messages at the user interface, such as one or more advertisements. The user interface module 205 also may generate one or more audio clips, such as songs, that are presented at a user interface that is compatible with presenting audio. In one embodiment, the user interface module 205 may present information to one or more devices such that the devices may augment and/or modify their user interfaces to provide the social networking messages and/or content. By way of example, a UE 101a accessing a social networking service 109a may receive information from the social networking service 109a that is used to generate a user interface at the UE 101a. The content presentation platform 103 may interface with the social networking service 109a to provide information to the service 109a and/or the UE 101a that presents the presentation of content associated with a social networking message. The user interface module 205 may also provide additional and/or alternative information to the service 109a and/or the UE 101a that may be used to present additional and/or alternative content at the user interface of the UE 101a and/or modify the content presented at the user interface of the UE 101a.

In one embodiment, the tracking module 207 determines the gaze tracking information associated with one or more users viewing social networking messages and/or content presented in association with social networking messages. The tracking module 207 may acquire gaze tracking information from one or more of the sensors 115 associated with the UE 101. By way of example, the UE 101 may be associated with a sensor 115a, such as a front facing camera, that is able to track the eye movements associated with users of the UE 101 and determine based on the eye movements where the user is looking on the display associated with the UE 101. The UE 101 may also be associated with a sensor 115b that is a specialized sensor (e.g., such as specialized glasses) that a user wears when using a UE 101 that is able to track the movements of the user's eye to determine where on the display the user associated with the UE 101 is viewing. Based on the tracking information, the tracking module 207 also may generate compiled gaze tracking information. The compiled gaze tracking information may be the compiled information associated with all of the users that view a particular user's social networking messages. The compiled gaze tracking information may be used to rank the particular users and determine how many followers the users have.

In one embodiment, based on the tracking information, the tracking module 207 may determine whether a user is viewing a social networking message and/or content that is presented in response to a user viewing a social networking message. The tracking module 207 may also analyze the specifics of the user viewing the social networking message and/or the content to cause the performance of additional functionality, such as initiating events associated with viewing the presented content over a threshold period of time and the like.

The content module 209 determines the content to present at a user interface. As discussed above, the presented content may be any type of content, such as visual content and/or audio content. By way of example, the content may be one or more additional social networking messages, one or more advertisements, one or more songs, one or more videos, or a combination thereof. The content module 209 may determine the content to present based on the linking associated between entities and/or content associated with the entities and the user. The content module 209 also may determine the content to present based on the ranking associated with the entities and the users. In one embodiment, the content module 209 determines the entities and/or content linked with a user and presents content associated with the linked entities and/or the linked content. Accordingly, if user A is interested in a car manufacturer, the content module 209 may present content regarding the car manufacturer in response to another user viewing a social networking message by user A. In one embodiment, if user A is interested in more than one entity, content associated with the entities may be presented at random, such that content associated with the entities is presented one at a time. For example, if user A likes entities Z and Y, upon a user viewing a social networking message associated with user A, content associated with entity Z may appear. Upon the user viewing another social networking message, or viewing the same social networking message, content associated with entity Y may appear. In one embodiment, the content presented to another user for viewing a social networking message associated with user A also may be based on a metric associated with the entity associated with the content. For instance, preference may be given by the content module 209 if entity Z is associated with a value of a metric that is higher than a value of the metric associated with entity Y.

The content module 209 may also determine the content based on any of the above-discussed rankings. For example, content may be presented on a display associated with a user viewing a social networking message from user A based on the user liking a competitor entity associated with an entity that user A likes. Such a situation may occur, for example, where the user is considered a potential customer of the entity that user A likes. The content module 209 may also select content that both the user that generated the social networking message and the user viewing the social networking message like. Such a situation may occur, for example, where the user also is considered a potential customer of the entity because the user previously indicated that they like the entity.

Figure 3:
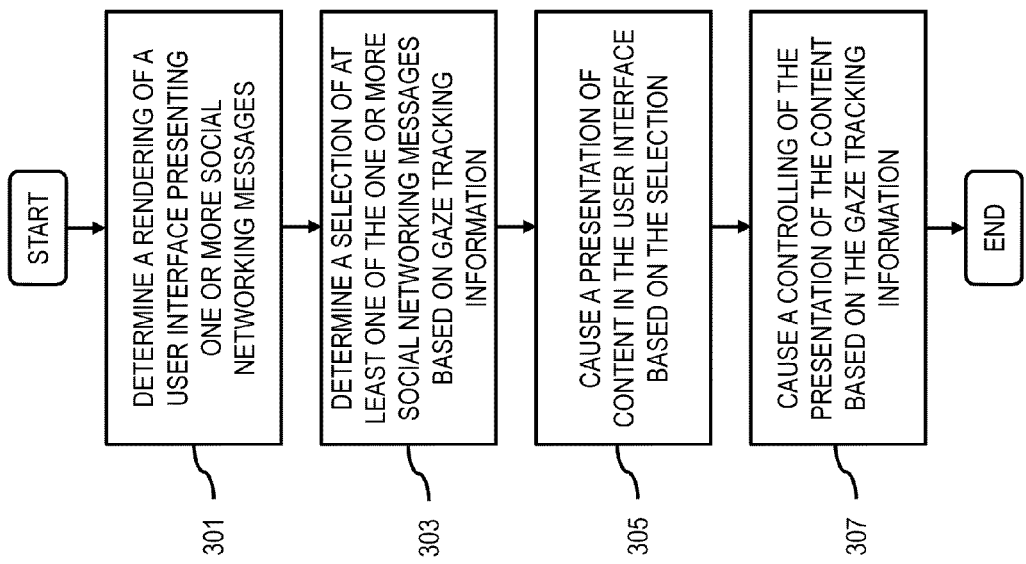
FIG. 3 is a flowchart of a process for presenting content in a user interface associated with social networking messages based on gaze tracking information, according to one embodiment.
Figure 8:
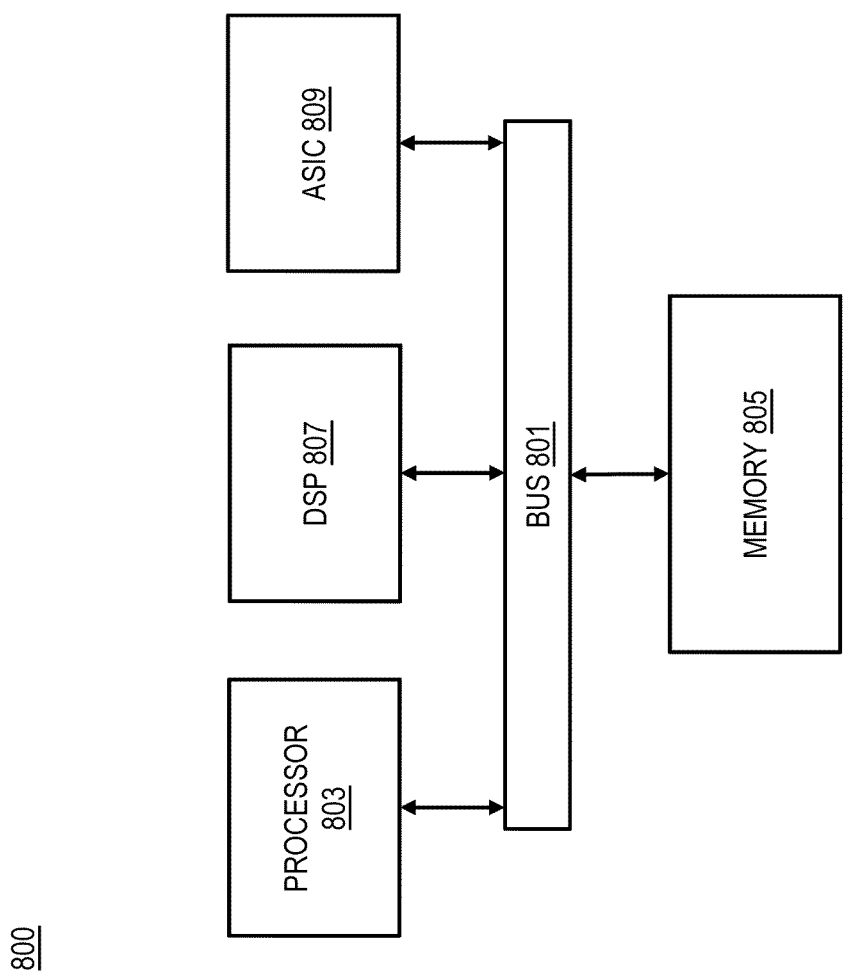
FIG. 8 is a diagram of a chip set that can be used to implement an embodiment of the invention.

FIG. 3 is a flowchart of a process for presenting content in a user interface associated with social networking messages based on gaze tracking information, according to one embodiment. In one embodiment, the content presentation platform 103 performs the process 300 and is implemented in, for instance, a chip set including a processor and a memory as shown in FIG. 8. In step 301, the content presentation platform 103 may determine a rendering of a user interface presenting one or more social networking messages. The content presentation platform 103 may determine the rendering based on interfacing with one or more applications 111 on the UE 101 and/or interfacing within one or more social networking services that provide the one or more social networking messages.

In step 303, the content presentation platform 103 determines a selection of at least one of the one or more social networking messages based, at least in part, on gaze tracking information. The gaze tracking information may be acquired by one or more sensors 115 that monitor the position of a user's eyes relative to the display that is presenting the one or more social networking messages. Based on the determination of the position of the user's eye with respect to the display, the content presentation platform 103 may determine that the user is viewing at least one of the one or more social networking messages. By way of example, the user may select the social networking message based on viewing the social networking messages, or by viewing the social networking message for a threshold period of time.

In step 305, the content presentation platform 103 causes, at least in part, a presentation of content at the user interface based, at least in part, on the selection. The presented content may be any type of content, such as visual content and/or audio content. Thus, for example, one or more additional social networking messages may be presented at the user interface, one or more audio clips may be presented at the user interface, one or more advertisements may be presented at the user interface, or a combination thereof. The content presented may be determined based on the above discussion regarding linking the content with a user associated with the social networking message. Thus, the content may be associated with the selected social networking message, one or more users associated with the social networking message, one or more other social networking messages associated with one or more users, or a combination thereof. The content presented may also be determined based on the above discussion regarding the ranking of the content, the users and/or the entities associated with the content and or the users. The content may be presented relative to the social networking message that a user viewed to trigger the presentation of the content such that an association between the content and the social networking message occurs. In such a scenario, the user that generated the social networking message may become an ambassador for the content and/or the entity associated with the content that is presented relative to the social networking message. Based on the number of followers that view the user's messages, a potentially large number of users may view the social networking messages and also view the content that is presented relative to the social networking messages.

In one embodiment, in step 307, the content presentation platform 103 may cause, at least in part, a controlling of the presentation of the content based, at least in part, on the gaze tracking information. In one embodiment, the presentation of the content is formatted so that the sensors 115 used for determining the gaze tracking information can better distinguish the presentation of the content over the other elements of the user interface. For instance, the presentation of the content may include a red border to better distinguish the rendering over other portions of the user interface.

The user's actions with respect to viewing the presentation of the content may control the presentation. For example, if the user looks away from the presentation of the content, the content presentation platform 103 may initiate a presentation of additional content, alternative content, or a combination thereof. Where the user looks at the presentation of the content for a threshold period of time, the content presentation platform 103 may initiate functionality associated with the content, such as sending additional content to an email address, SMS number, or other form of identifier associated with the user viewing the presentation of the content. Alternatively, or additionally, where the user looks at the presentation of the content for a threshold period of time, the content presentation platform 103 may resize the presentation of the content. In one embodiment, the content presentation platform 103 may enlarge the presentation so that additional and/or alternative information may be displayed, and to make the information displayed more easily perceivable. In one embodiment, where the user does not view the presentation of the content, or views the presentation of the content for less than a threshold period of time, the content presentation platform 103 may remove the presentation of the content. In one embodiment, the user's actions with respect to viewing the presentation of the social networking message may cause similar control over the presentation of the content. By way of example, where the user looks away from the original social networking message, the presentation platform 103 may remove the presentation of the content and/or present alternative and/or additional content. In one embodiment, where the presentation platform 103 presents audio in response to the user viewing the social networking message, the presentation platform 103 may present alternative and/or additional audio clips in response to the user looking away from the social networking message.

Figure 4:
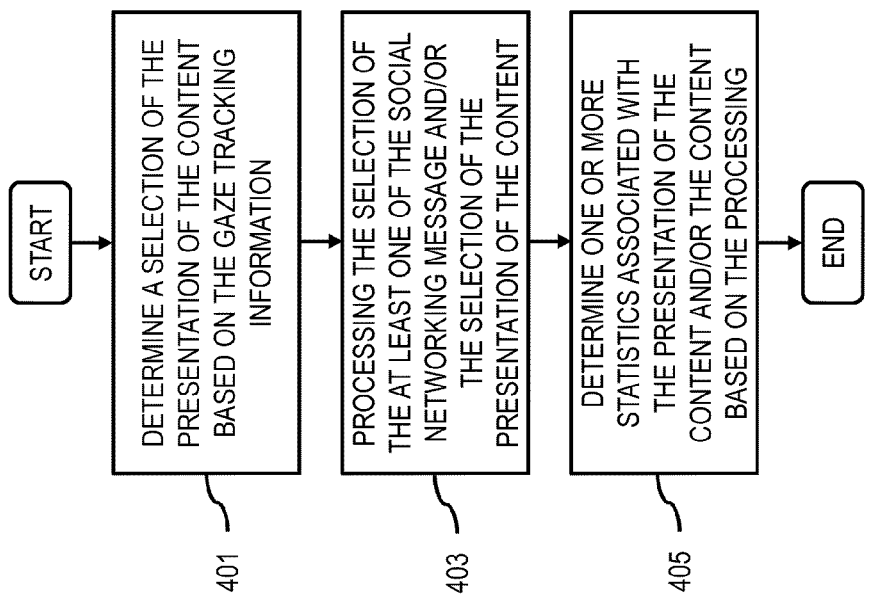
FIG. 4 is a flowchart of a process for determining one or more statistics associated with a presentation of content, according to one embodiment.

FIG. 4 is a flowchart of a process for determining one or more statistics associated with a presentation of content, according to one embodiment. In one embodiment, the content presentation platform 103 performs the process 400 and is implemented in, for instance, a chip set including a processor and a memory as shown in FIG. 8. In step 401, the content presentation platform 103 may determine a selection of the presentation of the content based, at least in part, on the gaze tracking information. Similar to the above discussion regarding the selection of the social networking message, the content presentation platform 103 may determine a selection of the presentation of the content based, at least in part, on gaze tracking information acquired by one or more sensors 115 that monitor the position of a users eye relative to the display that is presenting the one or more social networking messages. Based on the determination of the position of the user's eye with respect to the display, the content presentation platform 103 may determine that the user is viewing the presentation of the content. By way of example, the user may view the presentation of the content for longer than a threshold period of time. Based on such viewing, the content presentation platform 103 may determine that the user selected the presentation of the content.

In step 403, the content presentation platform 103 may process the selection of the at least one social networking message that caused the presentation of the content, the selection of the presentation of the content, or a combination thereof. Accordingly, the content presentation platform 103 can determine, for example, the number of times a social networking message is viewed and the number of times a presentation of content that is presented based on the selection of the social networking message is selected.

In step 405, the content presentation platform 103 determines one or more statistics associated with the presentation of the content, the content, or a combination thereof. The statistics may indicate, for example, the number of times a social networking message is presented, the number of times the social networking message is viewed and/or selected, the number of times a presentation of content is presented based on a selection of the social networking message, and a number of time the presentation of the content is selected. The content presentation platform 103 may then provide these statistics to one or more services 109 and/or content providers, and/or further analyze these statistics to determine information regarding the social networking message, the presentation of content, the content, the users associated with the social networking message, and the users that view the presentation of content. By way of example, the content presentation platform 103 may determine one or more metrics used in the rankings discussed herein based on these determined statistics. For instance, although a user may have a large number of users that view the social networking messages associated with the user, the number of users that view the presentation of content may be small. Further, although a user may have a slightly smaller number of users that view social networking messages as the previous user, the users that view the messages may always view the presentation of the content. Accordingly, such information may be processed and used in the presentation of content.

Figure 5:
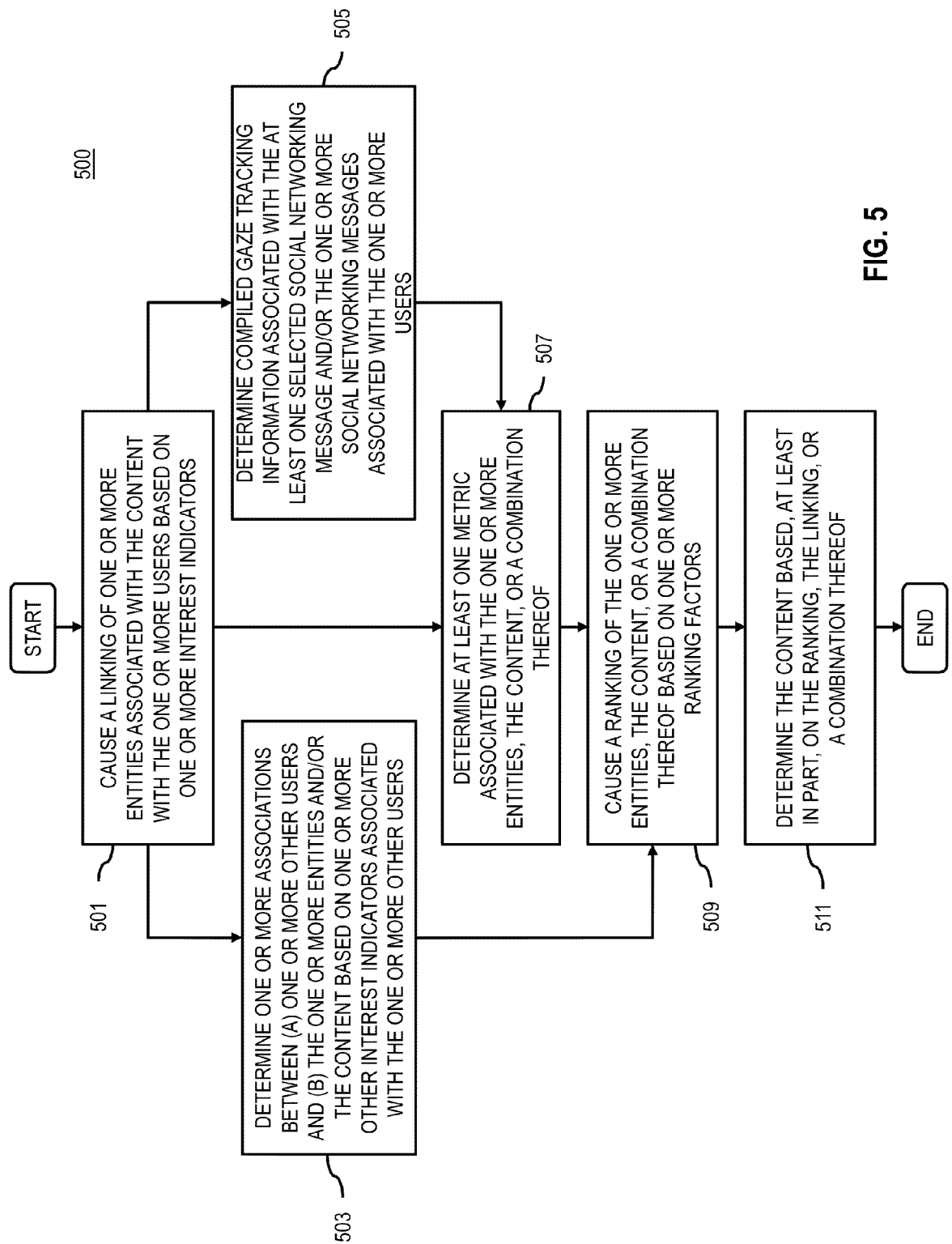
FIG. 5 is a flowchart of a process for determining content based, at least in part, on a linking, a ranking, or a combination thereof, according to one embodiment.

FIG. 5 is a flowchart of a process for determining content based, at least in part, on a linking, a ranking, or a combination thereof, according to one embodiment. In one embodiment, the content presentation platform 103 performs the process 500 and is implemented in, for instance, a chip set including a processor and a memory as shown in FIG. 8. In step 501, the content presentation platform 103 causes, at least in part, a linking of one or more entities associated with the content with the one or more users that generate one or more social networking messages based, at least in part, on one or more interest indicators associated with the one or more users regarding the one or more entities. As discussed above, one or more social networking websites 109 may allow users to indicate interests associated with entities based on one or more interest indicators. Such interest indicators may be one or more icons and/or buttons that a user may select to show interest in an entity. In one embodiment, the social networking services 109 may determine the interest of the users with the entities. The content presentation platform 103 may then link the users with the entities based on the users showing interest in the entities according to the information collected by the social networking services 109. In one embodiment, the content presentation platform 103 may be directly associated with one or more interest indicators that a user may select to indicate an interest in an entity. In such a case, the content presentation platform 103 may directly determine the link between entities and users without having to gather such information from one or more social networking services 109.

Further, in one embodiment, the content presentation platform 103 and/or the services 109 (e.g., social networking services 109) may determine disinterest between one or more entities and one or more users based on one or more interest indicators. Rather than indicating an interest in an entity, a user selecting an interest may indicate that the user is not interested in the entity. Further, a user being offered a chance to select an interest indicator but not selecting the interest indicator may imply that the user is not interested in the entity. In one embodiment, a user selecting an interest indicator associated with one entity may indicate a disinterest in another entity that is a competitor of the one entity.

In one embodiment, the process 500 may proceed to step 503, step 505, step 507, or a combination thereof. In step 503, the content presentation platform 103 determines one or more associations between (a) one or more other users and (b) the one or more entities, the content, or a combination thereof based, at least in part, on one or more other interest indicators associated with the one or more other users. Similar to the above discussion with respect to the users that generate the social networking messages, the content presentation platform 103 may determine the entities and/or the content that one or more other users are associated with based on the one or more other interest indicators. The content presentation platform 103 can therefore determine whether the one or more other users that view the social networking messages associated with the users are linked to the entities and/or content. The content presentation platform may then use this information, as discussed below.

In step 505, the content presentation platform 103 determines compiled gaze tracking information associated with the at least one selected social networking message, the one or more other social networking messages, or a combination thereof associated with the one or more users. The compiled gaze tracking information provides information to the content presentation platform 103 that allows the content presentation platform 103 to determine the total number of users that are viewing messages that are generated by a particular user. The compiled gaze tracking information indicates the total number of users that have viewed any one or more of the social networking messages generated by a user. Thus, the compiled gaze tracking information may provide the number of followers associated with a user.

In step 507, the content presentation platform 103 may determine at least one metric associated with the one or more entities, the content, the users, or a combination thereof. The at least one metric may be used to distinguish the entities, the content, or a combination thereof from each other. In one embodiment, the at least one metric may be a revenue generation metric. For instance, the entities may pay for the content to be presented next to the social networking messages. The entities may pay various amounts corresponding to various revenue generation metrics. Entities that are associated with a revenue generation metric that is larger than other entities may be ranked higher than the other entities such that the entities with the higher revenue generation metric have their content presented prioritized over the other entities. In one embodiment, the metric may also be based on the user associated with the social networking message. By way of example, where a user has a large number of followers, the metrics associated with the entities and/or the content may change as compared to a user that has a small number of followers. Thus, in one embodiment, the information determined at step 507 depends on the information provided by step 505.

In step 509, the content presentation platform 103 causes, at least in part, a ranking of the one or more entities, the content, or a combination thereof based, at least in part, on one or more ranking factors. As discussed above, the ranking factors may be based on the associations determined in step 503, the compiled gaze tracking information in step 505, and/or the metric determined in step 507. Rankings according to step 503 may be based on whether the user viewing the social networking message, and who will be viewing the presentation of the content, is interested or disinterested in the entity associated with the content or interested in another, competitor entity. Rankings associated with step 505 may be based on whether the user associated with the social networking message will reach a large user base when a presentation of content is presented next to the social networking message. Rankings associated with step 507 may be based on a metric associated with the one or more entities and/or the content. As discussed above, one metric may be a revenue generation metric. The revenue generation metric may be based on the compiled gaze tracking information determined in step 505 such that the metric may be one value for one user that is associated with certain compiled gaze tracking information, and the metric may be another value for another user that is associated with different compiled gaze tracking information. Accordingly, the metric may be different based on the one or more entities and the one or more users that are generating the social networking messages.

At step 511, the content presentation platform 103 determines the content based, at least in part, on the linking, the ranking, or a combination thereof. As discussed above, the content may be based on an entity that a user the generated the social networking message showed interest in. The content may also be based on whether the user that will be viewing the content also showed interest in the same entity or a different entity. The content may also be based on the total number of users that follow the user who generated the social networking message. Where the user has a large number of followers, the content may be different than where the user has a few number of followers. The content may also be based on a metric associated with the entity, such as whether the entity is associated with a certain geographical area associated with the user that generated the social networking message. The metric may also be based on one or more revenue generation metrics that determine the content that is presented. However, as discussed above, the presented content may be based on any combination of the rankings and/or the linkings discussed above.

Figure 6A:
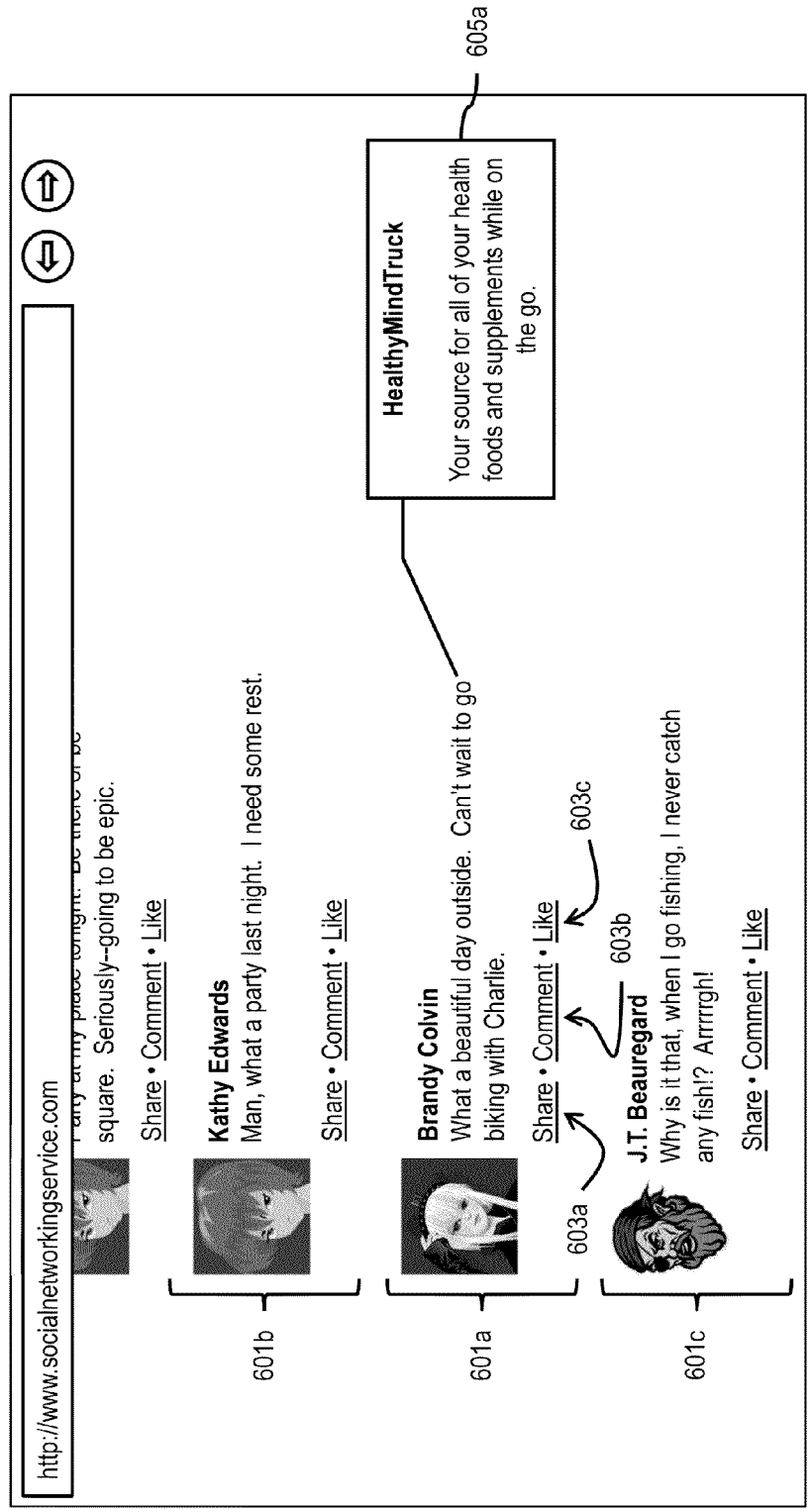
FIGS. 6A-6C are diagrams of user interfaces utilized in the processes of FIGS. 3-5, according to various embodiments.
Figure 6B:
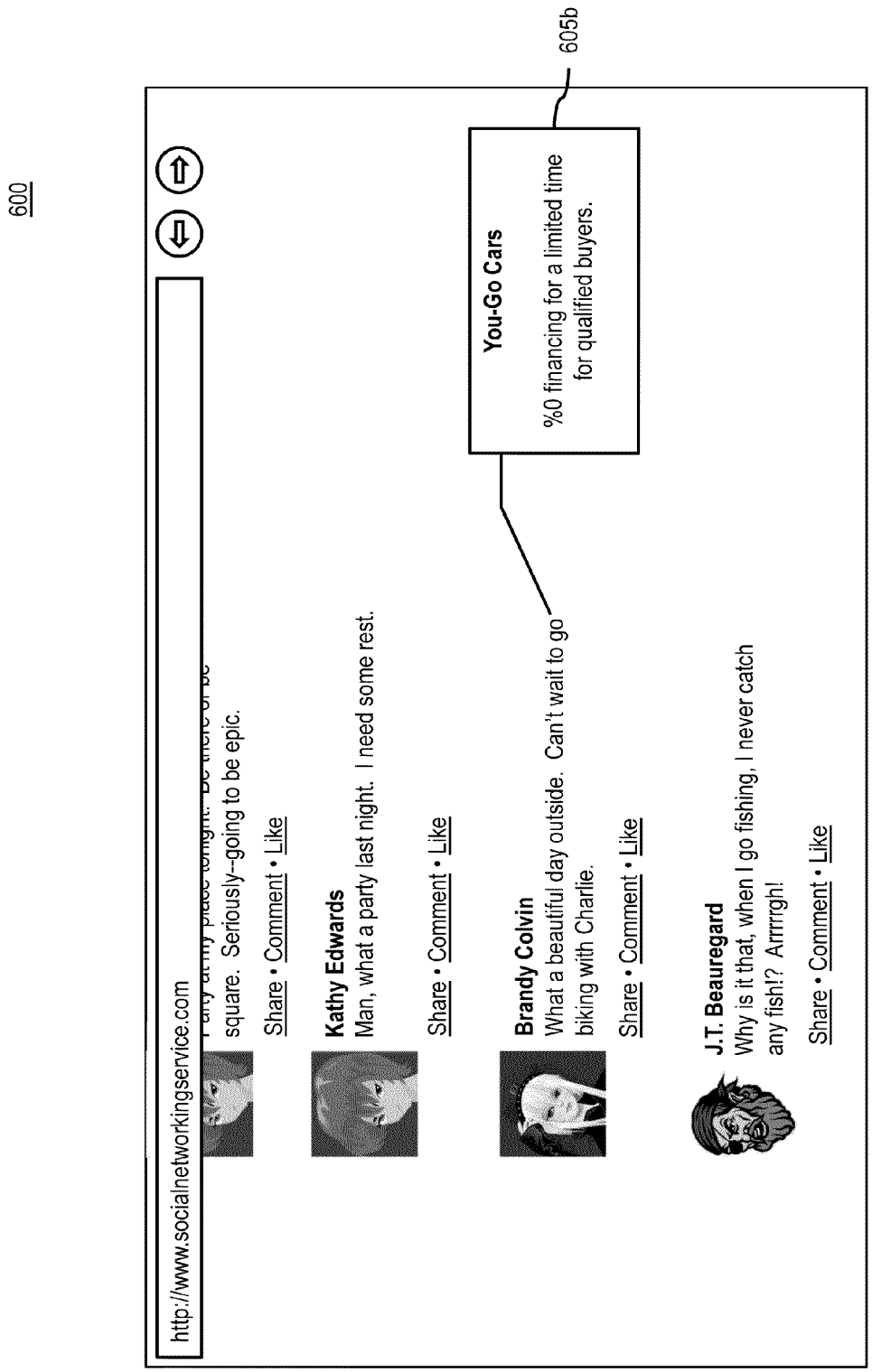
Figure 6C:
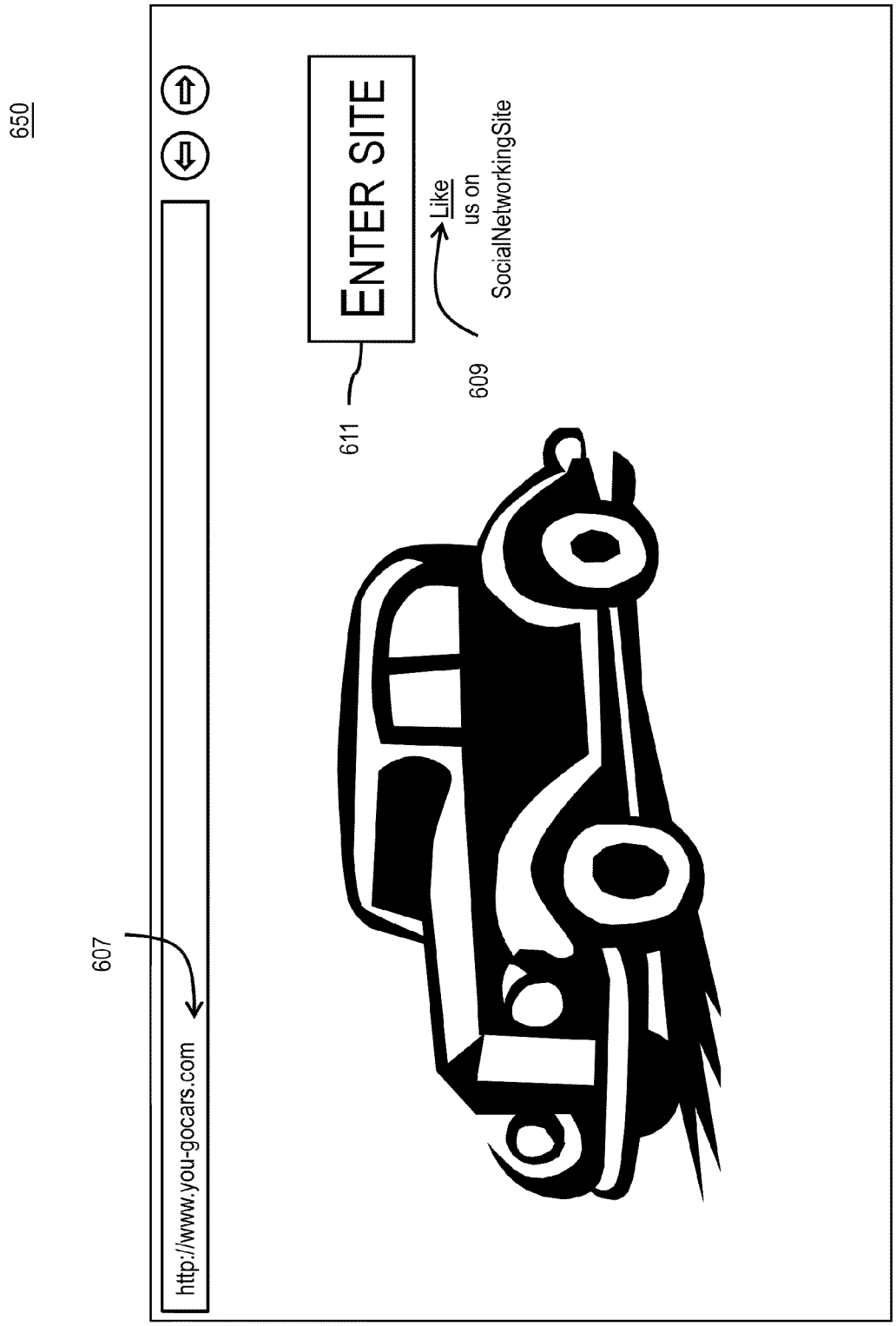

FIGS. 6A-6C are diagrams of user interfaces utilized in the processes of FIG. 3-5, according to various embodiments. FIG. 6A illustrates a user interface 600 that may be associated with a user of a UE 101*a* that is viewing information provided by a social networking service 109*a*. The information presented in the user interface 600 may include, for example, multiple social networking messages 601*a*-601*c*. For instance, the social networking message 601*a* is associated with a user Brandy Colvin, who generated the message, "What a beautiful day outside. Can't wait to go biking with Charlie." Associated with each social networking message 601*a*-601*c* may be one or more indicators 603*a*-603*c*. The indicator 603*a* may allow a user viewing the social networking message 601*a* to share the message 601*a* with another user associated with the social networking service. Such an indication may, in one embodiment, indicate that the user sharing the content is interested in the content. The indicator 603*b* may allow a user viewing the social networking message 601*a* to comment on the message 601*a*. The indicator 603*c* may allow a user to show interest in the user that generated the social networking message 601*a*, the content of the message 601*a*, or a combination thereof. By way of example, the indicator 603*c* is an exemplary interest indicator. In one embodiment, the user associated with the UE 101*a* that is displaying the user interface 600 may view the social networking message 601*a*. The content presentation platform 103 may determine that the user is viewing the social networking message 601*a* based on gaze tracking information acquired from one or more sensors 115 associated with the UE 101*a*. Accordingly, upon determining that the user is viewing the social networking message 601*a*, the content presentation platform 103 may present content associated with the user (e.g., Brandy Colvin) that generated the social networking message 601*a*. The user interface 600 includes the presentation of the content 605*a* regarding the entity HealthyMindTruck and the message, "Your source for all of your health foods and supplements while on the go." The content presentation platform 103 may cause the presentation of the content 605*a* until the content presentation platform 103 determines other gaze tracking information that changes the rendering. For example, as illustrated in FIG. 6B, the user interface 600 includes a different presentation of content 605*b*. The different presentation of content 605*b* may have resulted based on, for example, the user associated with the UE 101*a* displaying the user interface 600 looking away from the original presentation of content 605*b*. Thus, the content presentation platform 103 may cause the different presentation of content 605*b* to find other content that the user may find interesting and may gaze upon for a longer period of time. However, as discussed above, the content presentation platform 103 may perform additional controlling of the presentation of the content 605*a* according to the specific gaze tracking information that occurs. In alternative embodiment, the presentation of the content 605*a* and/or 605*b* may instead be associated with presenting one or more audio clips in response to the user viewing the social networking message 601*a*, such as presenting one or more songs that the user who created the social networking message has shown interest towards by one or more interest indicators.

FIG. 6C illustrates the user interface 650 associated with a UE 101*a* presenting a website associated with an entity 607. By way of example, the entity 607 may be an automobile manufacturer. The user interface 650 may include an interest indicator 609. The interest indicator 609 allows a user viewing the user interface 650 to select the interest indicator 609 to indicate an interest in the entity 607 associated with the user interface 650. In one embodiment, if the user selects the indicator 611 without selecting the indicator 609, the content presentation platform 103 may associate the user not selecting the indicator 609 as the user being disinterested in the entity 607. In one embodiment, the user interface 650 may lack the indicator 609. Rather, if the user selects the indicator 611 to enter the website, the content presentation platform 103 may determine that the user is interested in the entity.

The processes described herein for presenting content in a user interface associated with social networking messages based on gaze tracking information may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
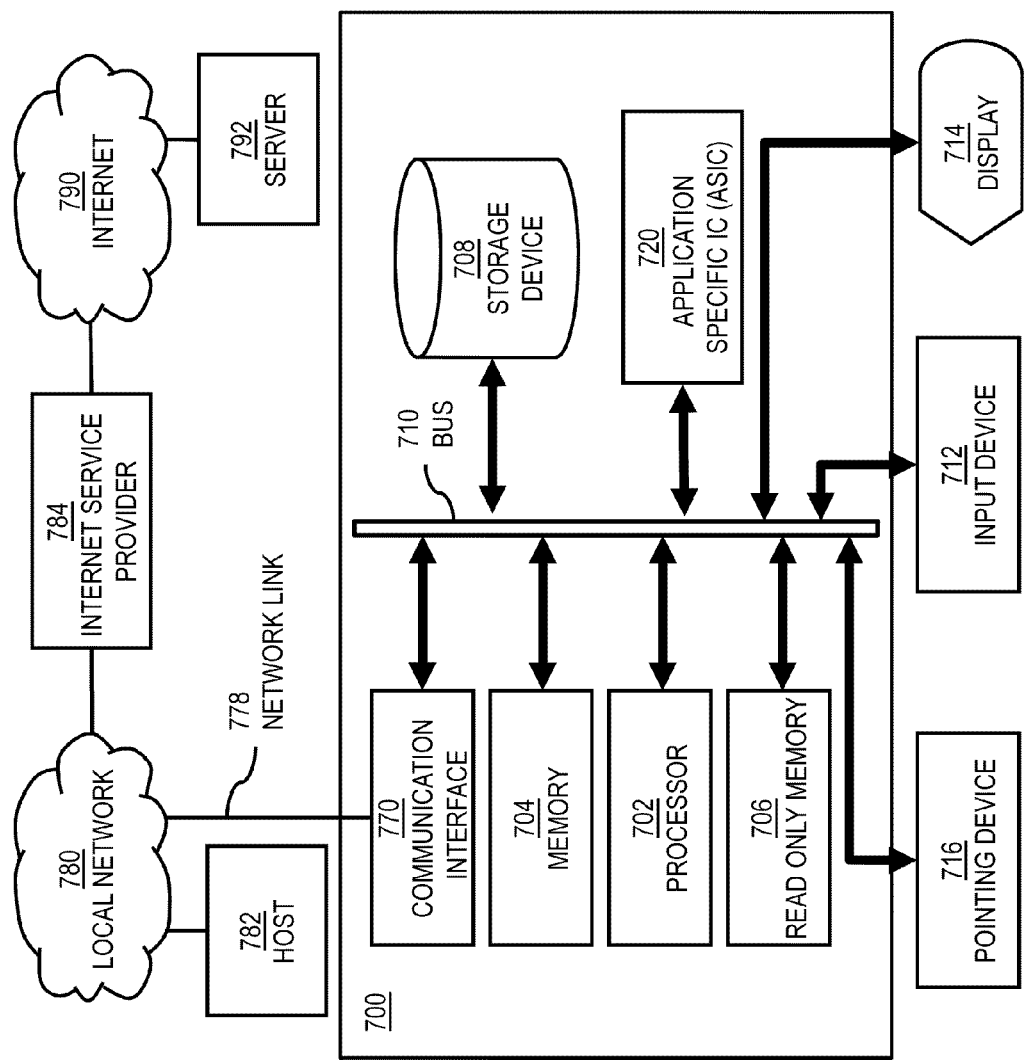
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to present content in a user interface associated with social networking messages based on gaze tracking information as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of presenting content in a user interface associated with social networking messages based on gaze tracking information.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to presenting content in a user interface associated with social networking messages based on gaze tracking information. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for presenting content in a user interface associated with social networking messages based on gaze tracking information. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for presenting content in a user interface associated with social networking messages based on gaze tracking information, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for presenting content in a user interface associated with social networking messages based on gaze tracking information to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to present content in a user interface associated with social networking messages based on gaze tracking information as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of presenting content in a user interface associated with social networking messages based on gaze tracking information.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to present content in a user interface associated with social networking messages based on gaze tracking information. The memory 805 also stores the data associated with or generated by the execution of the inventive steps.

Figure 9:
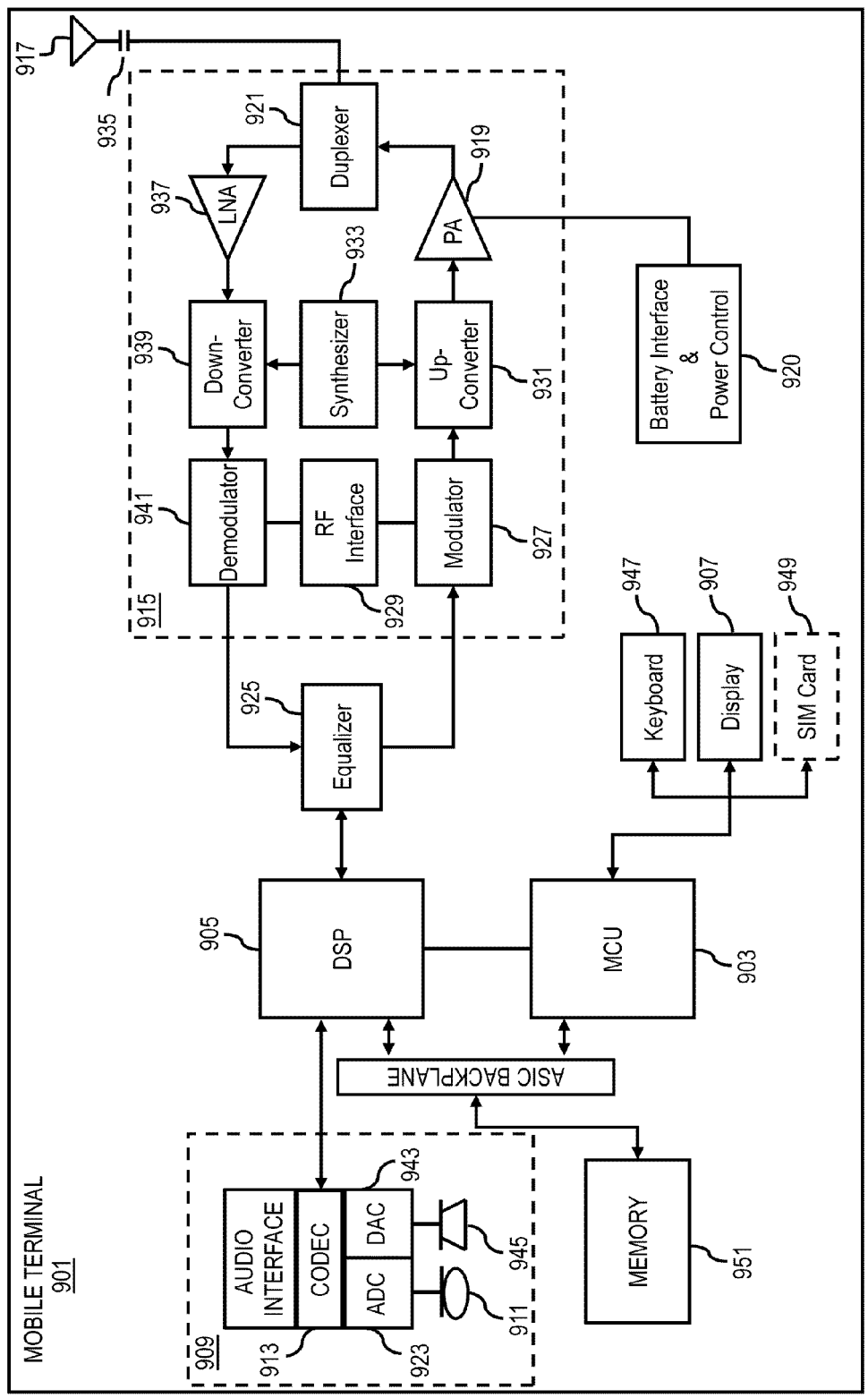
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of presenting content in a user interface associated with social networking messages based on gaze tracking information. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of presenting content in a user interface associated with social networking messages based on gaze tracking information. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to present content in a user interface associated with social networking messages based on gaze tracking information. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

I claim:

1. An apparatus comprising:
   at least one processor; and
   at least one memory including computer program code for one or more programs,
   the at least one memory and the computer program code configured to, with the at least one processor, cause the apparatus to perform at least the following,
   determine a rendering of a user interface presenting one or more social networking messages;
   determine a selection of at least one of the one or more social networking messages based, at least in part, on gaze tracking information; and
   cause, at least in part, a presentation of content at the user interface based, at least in part, on the selection,
   wherein the content is associated with the at least one selected social networking message, one or more users associated with the at least one selected social networking message, one or more other social networking messages associated with the one or more users, or a combination thereof.

2. An apparatus of claim 1, wherein the apparatus is further caused to:
   cause, at least in part, a controlling of the presentation of the content based, at least in part, on the gaze tracking information.

3. An apparatus of claim 2, wherein the controlling of the presentation of the content includes initiating a presentation of additional content, alternative content, or a combination thereof, initiating functionality associated with the content, resizing the presentation of the content, removing the presentation of the content, or a combination thereof.

4. An apparatus of claim 2, wherein the apparatus is further caused to:
   determine a selection of the presentation of the content based, at least in part, on the gaze tracking information; and
   process and/or facilitate a processing of the selection of the at least one of the social networking message, the selection of the presentation of the content, or a combination thereof to determine one or more statistics associated with the presentation of the content, the content, or a combination thereof.

5. An apparatus of claim 1, wherein the apparatus is further caused to:
   cause, at least in part, a linking of one or more entities associated with the content with the one or more users based, at least in part, on one or more interest indicators associated with the one or more users regarding the one or more entities; and
   determine the content based, at least in part, on the linking.

6. An apparatus of claim 5, wherein the apparatus is further caused to:
   cause, at least in part, a ranking of the one or more entities, the content, or a combination thereof based, at least in part, on one or more ranking factors,
   wherein the determination of the content is based, at least in part, on the ranking.

7. An apparatus of claim 6, wherein the apparatus is further caused to:
   determine one or more associations between (a) one or more other users and (b) the one or more entities, the content, or a combination thereof based, at least in part, on one or more other interest indicators associated with the one or more other users,
   wherein the one or more ranking factors are based, at least in part, on the one or more associations.

8. An apparatus of claim 1, wherein the presentation of the content is relative to a rendering of the at least one social networking message to establish an association between the at least one social networking message, the one or more users, or a combination thereof and the presentation of the content.

9. A method comprising:
   determining a rendering of a user interface presenting one or more social networking messages;

determining a selection of at least one of the one or more social networking messages based, at least in part, on gaze tracking information; and causing, at least in part, a presentation of content at the user interface based, at least in part, on the selection, wherein the content is associated with the at least one selected social networking message, one or more users associated with the at least one selected social networking message, one or more other social networking messages associated with the one or more users, or a combination thereof.

10. A method of claim 9, further comprising:

causing, at least in part, a controlling of the presentation of the content based, at least in part, on the gaze tracking information.

11. A method of claim 10, wherein the controlling of the presentation of the content includes initiating a presentation of additional content, alternative content, or a combination thereof, initiating functionality associated with the content, resizing the presentation of the content, removing the presentation of the content, or a combination thereof.

12. A method of claim 10, further comprising:

determining a selection of the presentation of the content based, at least in part, on the gaze tracking information; and processing and/or facilitating a processing of the selection of the at least one of the social networking message, the selection of the presentation of the content, or a combination thereof to determine one or more statistics associated with the presentation of the content, the content, or a combination thereof.

13. A method of claim 9, further comprising:

causing, at least in part, a linking of one or more entities associated with the content with the one or more users based, at least in part, on one or more interest indicators associated with the one or more users regarding the one or more entities; and determining the content based, at least in part, on the linking.

14. A method of claim 13, further comprising:

causing, at least in part, a ranking of the one or more entities, the content, or a combination thereof based, at least in part, on one or more ranking factors, wherein the determination of the content is based, at least in part, on the ranking.

15. A method of claim 14, further comprising:

determining one or more associations between (a) one or more other users and (b) the one or more entities, the content, or a combination thereof based, at least in part, on one or more other interest indicators associated with the one or more other users, wherein the one or more ranking factors are based, at least in part, on the one or more associations.

16. A method of claim 9, wherein the presentation of the content is relative to a rendering of the at least one social networking message to establish an association between the at least one social networking message, the one or more users, or a combination thereof and the presentation of the content.

17. An apparatus of claim 1, wherein the apparatus is a mobile phone further comprising:

user interface circuitry and user interface software configured to facilitate user control of at least some functions of the mobile phone through use of a display and configured to respond to user input; and a display and display circuitry configured to display at least a portion of a user interface of the mobile phone, the display and display circuitry configured to facilitate user control of at least some functions of the mobile phone.

18. A non-transitory computer-readable storage medium carrying one or more sequences of one or more instructions which, when executed by one or more processors, cause an apparatus to at least perform the following steps:

determining a rendering of a user interface presenting one or more social networking messages;

determining a selection of at least one of the one or more social networking messages based, at least in part, on gaze tracking information; and causing, at least in part, a presentation of content at the user interface based, at least in part, on the selection, wherein the content is associated with the at least one selected social networking message, one or more users associated with the at least one selected social networking message, one or more other social networking messages associated with the one or more users, or a combination thereof.

19. A non-transitory computer program product including one or more sequences of one or more instructions which, when executed by one or more processors, cause an apparatus to at least perform the steps:

determining a rendering of a user interface presenting one or more social networking messages;

determining a selection of at least one of the one or more social networking messages based, at least in part, on gaze tracking information; and causing, at least in part, a presentation of content at the user interface based, at least in part, on the selection, wherein the content is associated with the at least one selected social networking message, one or more users associated with the at least one selected social networking message, one or more other social networking messages associated with the one or more users, or a combination thereof.

20. A method comprising facilitating creating and/or facilitating modifying (1) at least one device user interface element and/or (2) at least one device user interface functionality, the (1) at least one device user interface element and/or (2) at least one device user interface functionality based, at least in part, on the following steps:

determining a rendering of a user interface presenting one or more social networking messages;

determining a selection of at least one of the one or more social networking messages based, at least in part, on gaze tracking information; and causing, at least in part, a presentation of content at the user interface based, at least in part, on the selection, wherein the content is associated with the at least one selected social networking message, one or more users associated with the at least one selected social networking message, one or more other social networking messages associated with the one or more users, or a combination thereof.

21. An apparatus of claim 1, wherein the apparatus is further configured to:

collect the gaze tracking information from user eye tracking sensors.

22. An apparatus of claim 21, wherein the user eye tracking sensors include image sensors, eye tracking glasses, or a combination thereof.

* * * * *